(12) United States Patent
Hamann et al.

(10) Patent No.: US 7,402,009 B2
(45) Date of Patent: Jul. 22, 2008

(54) MACHINE AND MACHINING METHOD FOR A LONG PROFILE

(75) Inventors: Jean-Christophe Hamann, La Baule (FR); Maël Provin, Besne (FR)

(73) Assignee: Airbus France, Toulouse (FR)

( * ) Notice: Subject to any disclaimer, the term of this patent is extended or adjusted under 35 U.S.C. 154(b) by 187 days.

(21) Appl. No.: 11/007,211

(22) Filed: Dec. 9, 2004

(65) Prior Publication Data
US 2005/0172467 A1 Aug. 11, 2005

(30) Foreign Application Priority Data
Dec. 15, 2003 (FR) .................................. 03 51057

(51) Int. Cl.
*B23C 1/12* (2006.01)
(52) U.S. Cl. ..................... 409/212; 409/202
(58) Field of Classification Search ................ 409/199, 409/202, 205, 212, 219
See application file for complete search history.

(56) References Cited

U.S. PATENT DOCUMENTS

| | | | | |
|---|---|---|---|---|
| 1,460,525 A * | 7/1923 | Wickland | ................ | 409/199 |
| 2,408,517 A * | 10/1946 | Howard | ................ | 33/21.3 |
| 2,687,880 A * | 8/1954 | Waterson | ................ | 266/56 |
| 2,705,629 A * | 4/1955 | Miller | ................ | 266/56 |
| 2,842,238 A * | 7/1958 | Shaw et al. | ................ | 409/179 |
| 3,009,049 A * | 11/1961 | Stanley | ................ | 219/60 R |
| 3,485,306 A * | 12/1969 | Gulley | ................ | 173/32 |
| 3,547,002 A * | 12/1970 | Walter | ................ | 409/101 |
| 3,572,669 A * | 3/1971 | Brand | ................ | 266/56 |
| 3,575,364 A * | 4/1971 | Frederick | ................ | 266/56 |
| 3,668,971 A * | 6/1972 | Dever | ................ | 409/131 |
| 3,682,455 A * | 8/1972 | Baker | ................ | 266/56 |
| 3,700,223 A * | 10/1972 | Elliot | ................ | 266/55 |
| 3,807,715 A * | 4/1974 | Nelson et al. | ................ | 266/261 |
| 3,856,283 A * | 12/1974 | Johnson | ................ | 266/56 |
| 3,975,003 A * | 8/1976 | Buford | ................ | 266/56 |
| 4,007,705 A * | 2/1977 | Sherer et al. | ................ | 118/710 |
| 4,091,514 A * | 5/1978 | Motes-Conners et al. | ... | 29/33 T |
| 4,148,467 A * | 4/1979 | Sargeant | ................ | 266/57 |
| 4,297,061 A * | 10/1981 | Wolfe et al. | ................ | 409/131 |
| 4,460,162 A * | 7/1984 | Rusk | ................ | 266/56 |
| 4,469,310 A * | 9/1984 | Jones | ................ | 266/56 |
| 4,850,763 A * | 7/1989 | Jack et al. | ................ | 409/178 |
| 5,189,933 A * | 3/1993 | Ricci | ................ | 82/113 |
| 5,343,603 A | 9/1994 | Pioch | | |

(Continued)

FOREIGN PATENT DOCUMENTS

FR 2685239 6/1993

(Continued)

*Primary Examiner*—Monica S. Carter
*Assistant Examiner*—Eric A Gates
(74) *Attorney, Agent, or Firm*—Oblon, Spivak, McClelland, Maier & Neustadt, P.C.

(57) ABSTRACT

This invention relates to machining of long profiles, that can be bent, held in place using two clamping arms (10) clamping the section to be machined. According to the invention, the profile (12) does not move during machining and the mobile arms are not used to move the profile in front of the tool; the arms move with the tool to the various locations to be machined. Auxiliary supports (25) are flexible in the plane of the profile and provide sufficient support while enabling the profile to deform as a result of stresses applied to it. Machining is more precise and remaining stresses are reduced.

14 Claims, 6 Drawing Sheets

U.S. PATENT DOCUMENTS

| | | | |
|---|---|---|---|
| 5,477,597 A * | 12/1995 | Catania et al. | 29/34 B |
| 5,562,043 A * | 10/1996 | Gromes | 105/29.1 |
| 5,611,130 A * | 3/1997 | Rummell et al. | 29/34 B |
| 5,615,696 A * | 4/1997 | Lawler | 134/104.2 |
| 5,661,892 A * | 9/1997 | Catania et al. | 29/525.02 |
| 5,685,996 A * | 11/1997 | Ricci | 219/121.39 |
| 5,779,406 A * | 7/1998 | Astor | 409/132 |
| 6,098,260 A * | 8/2000 | Sarh | 29/243.53 |
| 6,267,037 B1 * | 7/2001 | McCoy et al. | 83/745 |
| 6,711,804 B2 * | 3/2004 | Eicher | 29/563 |
| 7,179,027 B2 * | 2/2007 | Bugh | 409/178 |
| 7,237,309 B2 * | 7/2007 | Nicaise | 29/27 C |

FOREIGN PATENT DOCUMENTS

| | | |
|---|---|---|
| FR | 2799673 | 4/2001 |
| WO | WO 2003/047813 A1 * | 6/2003 |

* cited by examiner

MACHINE AND MACHINING METHOD FOR A LONG PROFILE

DESCRIPTION

The subject of this invention is a machine for machining a long profile and a corresponding method; in this presentation, the term machining is defined to include conventional operations for removing material such as milling, turning, drilling, cutting, etc., but also other operations such as marking, assembly, welding or placement of fasteners such as rivets, each time using an appropriate tool.

This type of long profile to be machined is used for example in aeronautics to form aircraft skin stiffeners; these stiffeners may be straight or bent around a portion of a circle or at a variable radius, particularly if they are to form frames. Some difficulties in machining originate from large differences (possibly up to several millimetres) between their nominal dimensions and their real dimensions and their flexibility, which introduces serious deformations when machining forces are applied. Machining may also cause or release internal stresses, and therefore other deformations, depending on the case. Therefore, the real shape of the profile is not determined precisely so that machining can be done directly, and it continues to vary during this machining. A final manual recalibration is necessary to modify the profile to the required shape.

One possible method of machining the profile consists of clamping it in several fixed mandrels, the positions of which correspond to a theoretical shape of the profile, and bringing tools successively to locations to be machined. The mandrels must be sufficiently rigid to resist the forces that are generated. This method is difficult to implement sufficiently accurately for profiles several meters long.

Special numerical control machines have also been designed. French patents 2 685 239 and 2 799 673 describe two such machines. Essentially, they include a pair of profile clamping mandrels at a small distance, to isolate what is called a window between them through which a short profile length can be seen, on which the machining is done. The function of the mandrels is to place the section of the profile included in the window in its theoretical shape and to keep it in this shape during machining, with the rest of the profile being free. When machining is finished, one of the mandrels is loosened and the other mandrel is moved by an automatic control, while continuing to clamp the profile with it; changing clamping from one mandrel to the other then brings the mobile mandrel close to the other mandrel without moving the profile, for which a new section is then included in the window and can be machined in turn.

This type of machine represents significant progress. It is fairly compact and not very complicated, and only includes the pair of mandrels in addition to the tool holder. These machines can be used for a fast assembly and disassembly of the profile; and by providing sufficient stiffness to the section of the profiles included within the window, they enable more precise machining and higher cutting speed that improve the machining quality and reduce deformations imposed on the profile due to the attenuation of vibrations and cutting forces.

However, these machines are not suitable for all profiles. Correct operation limits may occur for the longest profiles and profiles for which the curvature is important, since guidance by mandrels then becomes difficult. And since inaccuracies in each movement of mandrels accumulate along the profile, the final machining can be done with an excessive longitudinal offset.

The invention was designed to overcome these insufficiencies and in its most general form consists of a machine for machining a long profile, comprising a tool holder, a pair of clamping mandrels free to move along the profile, and mandrel and tool holder displacement mechanisms, characterised in that it comprises a profile support including a stationary structure, and stationary profile clamping mandrels mounted on the stationary structure through flexible connections.

This machine uses the same design as in prior art namely mobile profile clamping mandrels to delimit a machining window, but the mobile mandrels do not move the profile which remains stationary on the support mandrels: they are moved with the tool holder along the profile, once again to put the sections of the profile that they clamp successively in the theoretical shape, but without producing any large accumulated error during their displacements. Stationary support mandrels are provided with flexible connections to follow the displacements imposed on the profile by the mobile mandrels and variations in deformations, without producing internal stresses. The mobile mandrels may be moved as far as positions defined by markers in advance, in other words with respect to a fixed reference, which give better precision than machines operating by displacement increments as described in the above mentioned French patents.

The flexibility in the assembly of stationary mandrels prevents static indeterminacy that could occur if rigid stationary mandrels and rigid mobile mandrels are combined, particularly for automated machining in which case possibilities of control and action would be smaller in the case of damage or excessive deformation of the profile.

One particular important case is related to bent profiles. The machine then advantageously includes a central stationary column to which the stationary structure is attached, a pair of arms turning around the column and finishing on the corresponding mobile jaws, and a portal forming part of the tool holder and supported by the column and by a circular rail concentric with the column.

It would be possible and easy for rotating arms to be controlled to determined angular positions. The portal is continuously well supported at its two ends and can thus react to high cutting forces.

The stationary structure is advantageously composed of arms formed from sliding sections, for which the total length is adjustable; they can thus be adjusted to different profiles, particularly different diameters and/or a variable radius in the previously considered case of a machine with a stationary central column, to which all these arms then lead in a radial arrangement.

The mobile mandrels and their supports may be similar to stationary mandrels, except that the mobile mandrels must be able to impose a predetermined position on the section of the profile present in the window. In the current case of a plane profile, it is advantageous if the mobile mandrels are installed on independent and deformable supports, for example also in the shape of radial arms formed from sliding sections capable of displacing mobile mandrels perpendicularly to the profile in their plane and also to turn them around an axis perpendicular to this plane, while becoming rigid when the required positions of the jaws have been reached.

Finally, a simple operating mode facilitating displacement of mobile jaws is obtained if the stationary jaws are provided with a mechanism by which they can be retracted.

The invention also relates to a method for machining a long profile, accomplished with a numerical control machine including a pair of mobile mandrels clamping successive sections of the profile and a tool placed between mobile mandrels, characterised in that the profile remains retained on a support at an approximately fixed position, and the mobile mandrels and the tool move along the profile over an entire length to be machined.

The invention will now be described with reference to figures attached to this description:

Figure 1:
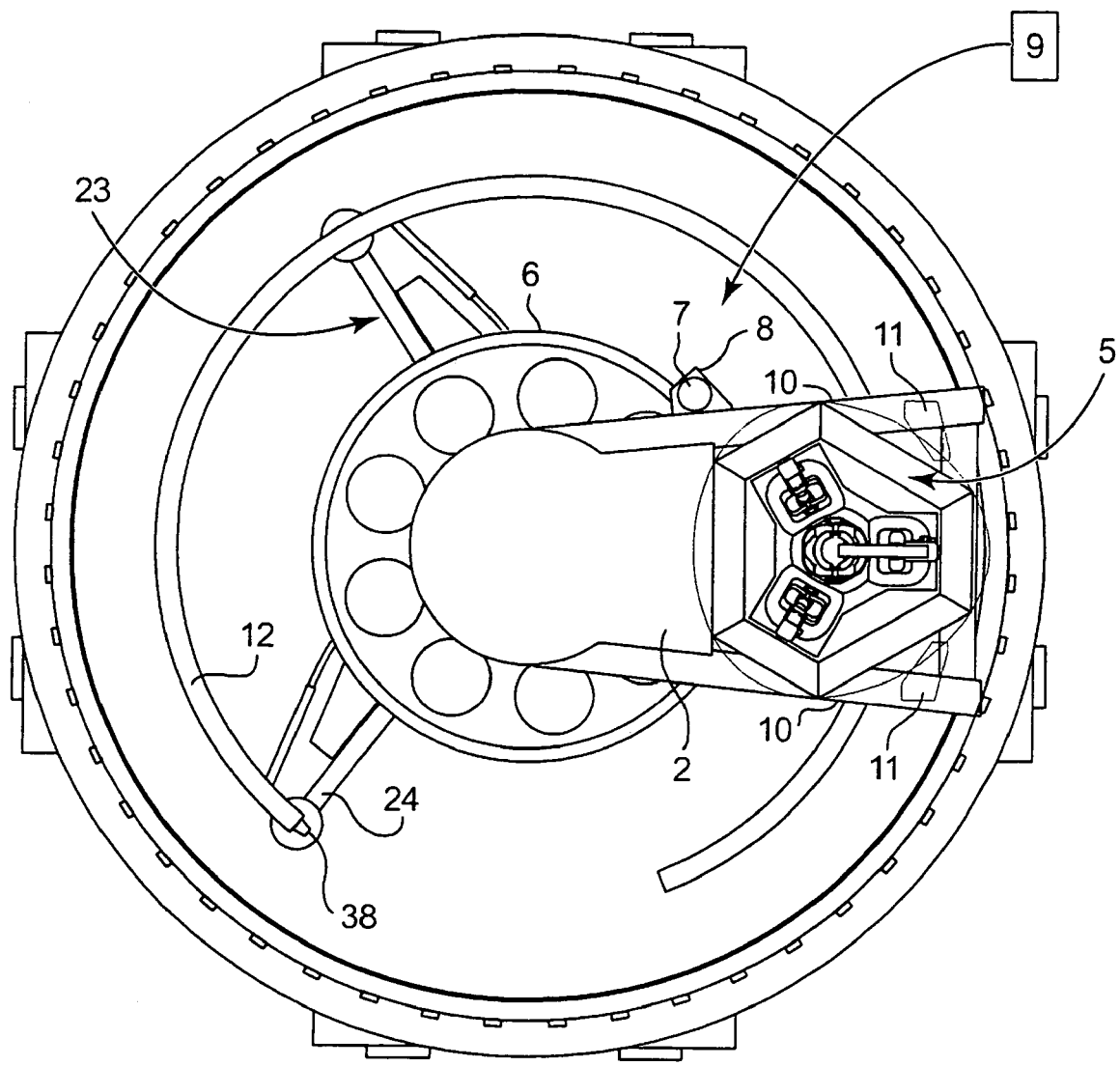
FIG. 1 shows a top view of the machine.
Figure 2:
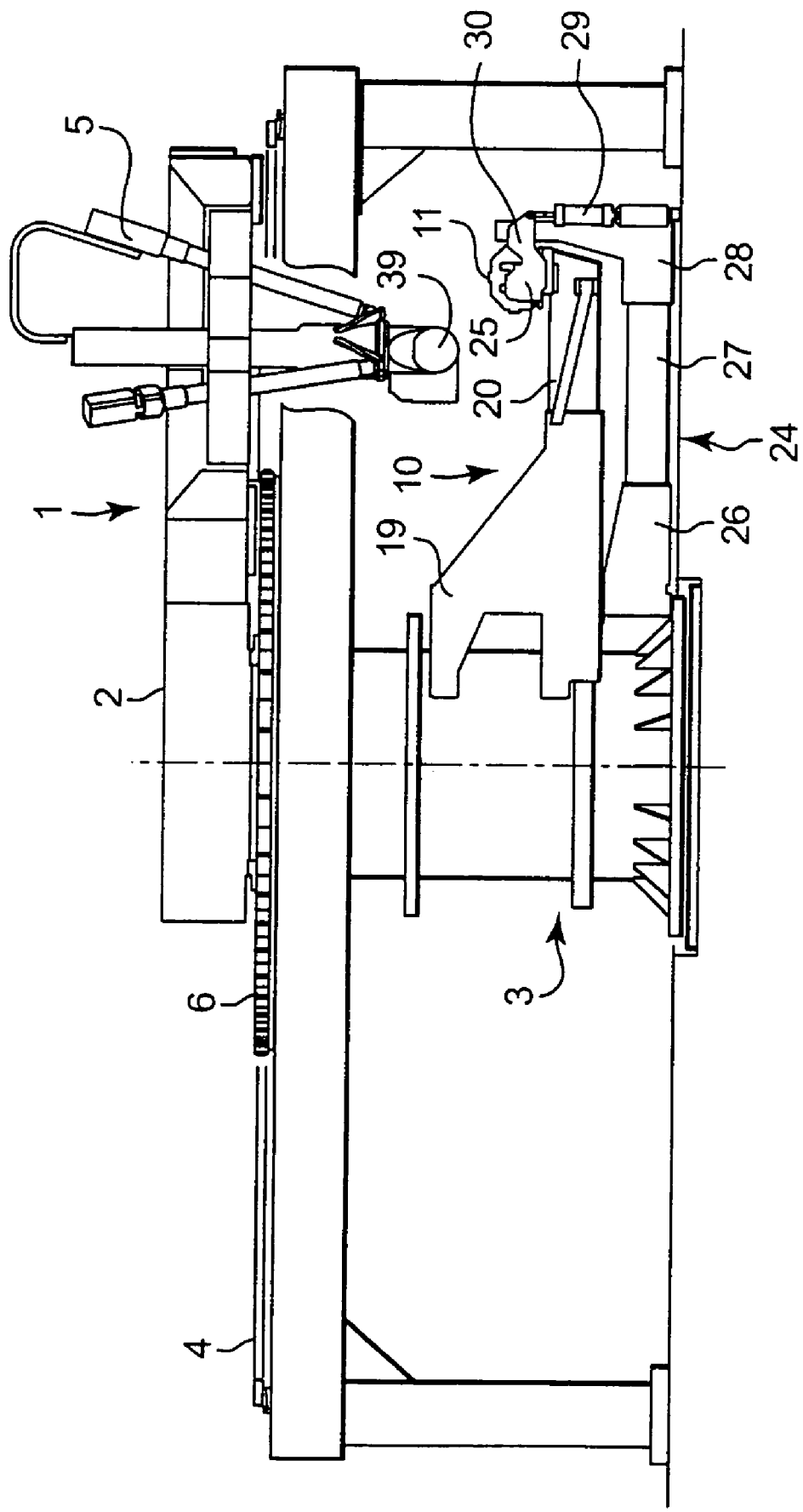
FIG. 2 shows a side view of the machine.

The machine comprises firstly a portal 1 (FIGS. 1 and 2) comprising an upper crosspiece 2, a central column 3 and a concentric circular track 4. The crosspiece 2 comprises a tool holder 5 that may have multiple axes and that is provided with a machining tool (in the definition indicated at the beginning). The tool holder 5 can move the tool 39 within a sufficiently large machining volume under the portal 1. The crosspiece 2 is moved by rotation around the central column 3 by a rack and pinion system with no clearance composed of a toothed ring 6 fixed to the central column 3 and a pinion 7, driven by a stepping motor 8 and fixed to the crosspiece 2. The rotational displacement of the crosspiece 2 may be continuous or discontinuous, as will be seen. In any case, the machine comprises a numerical control 9 that is only shown symbolically here and can determine the position and displacement of the crosspiece 2 at any time. Mechanical encoders and indexers may be used, or other known means may be used for monitoring the displacement of the crosspiece 2 or stopping it at specific positions. Machining can be done while the crosspiece 2 is stopped or moving.

Figure 3:
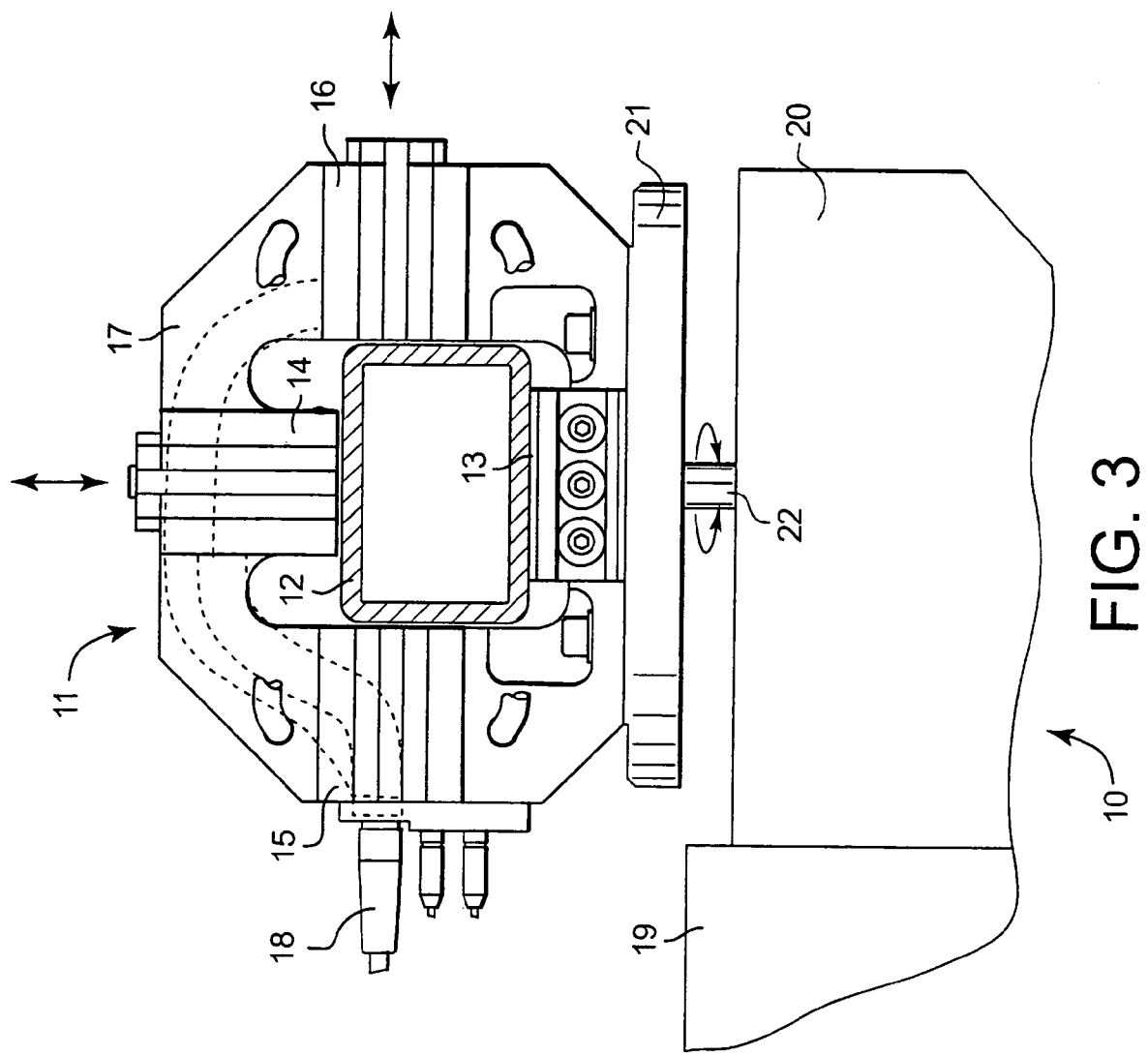
FIG. 3 shows a view of a mobile clamping mandrel.
Figure 4:
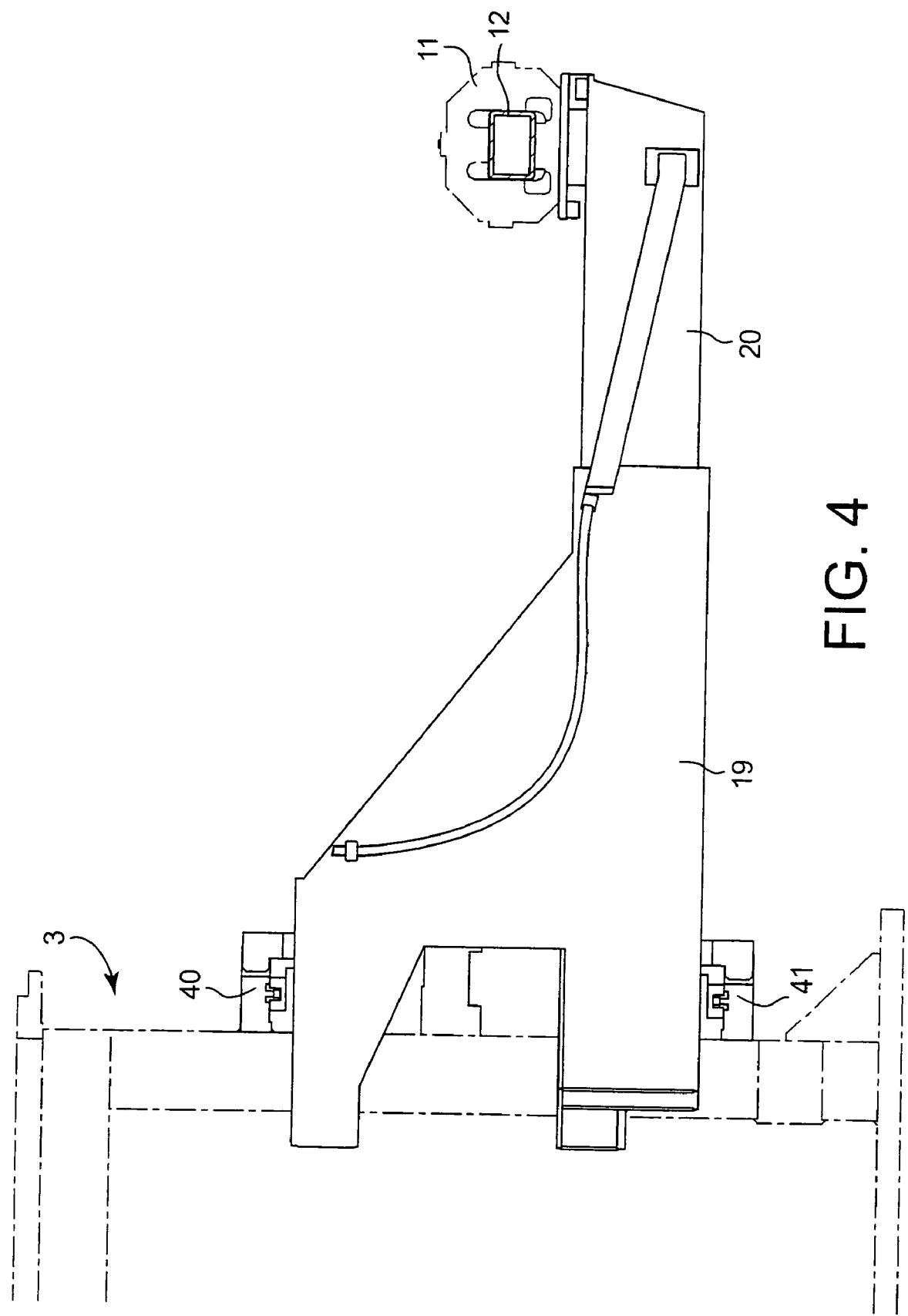
FIG. 4 shows a view of a carrier arm of one of the mobile clamping mandrels.
Figure 5:
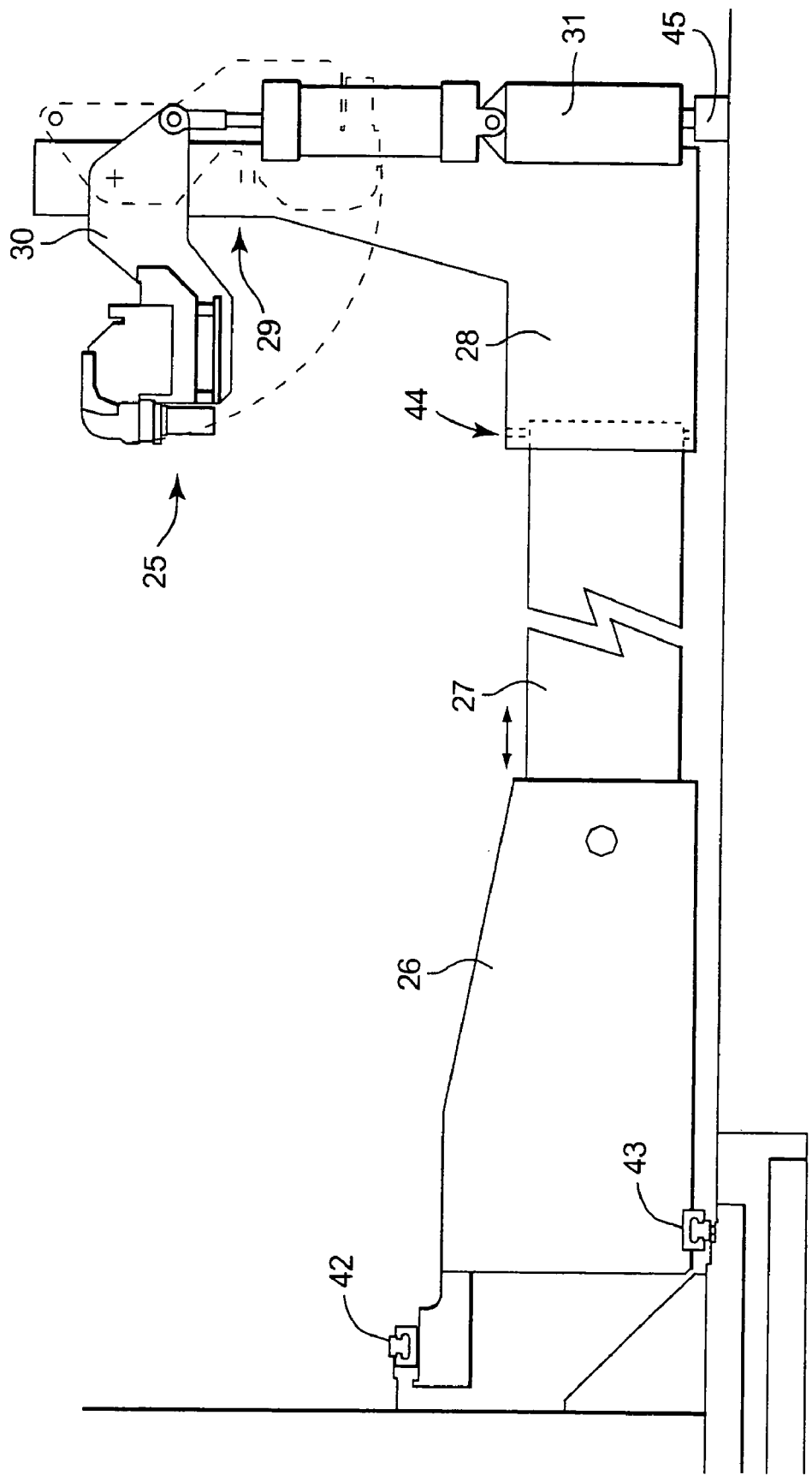
FIG. 5 shows a view of a stationary arm carrying one of the stationary support mandrels.
Figure 6:
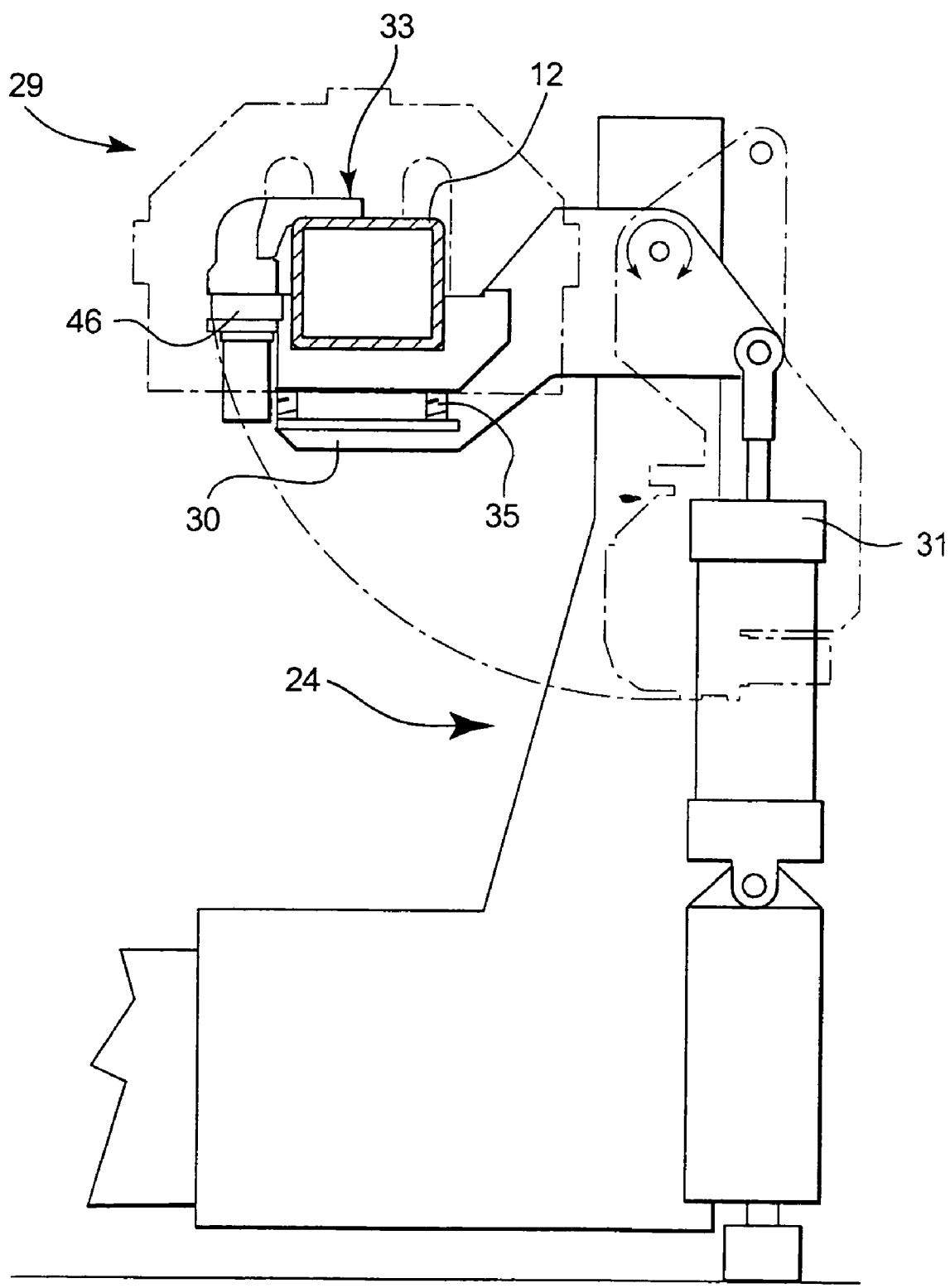
FIG. 6 shows a view of a stationary mandrel and adjacent sections of the arm.

The machine also includes a pair of arms 10 (FIGS. 1, 2, 3 and 4) supported by column 3 under the crosspiece 2 and carrying mandrels 11 at their end far from the column 3. The mandrels 11 are assigned to clamping the profile 12. They are fitted with positioning and clamping jaws, with an arrangement and a shape matching the section of the profile 12. In the case shown here (FIG. 3) of a quadrilateral profile 12, there is a fixed vertical jaw 13, a mobile vertical jaw 14 opposite the previous jaw, a fixed horizontal jaw 15 and a mobile horizontal jaw 16 opposite the previous jaw, all these jaws being located on an arc-shaped support 17. The fixed jaws 13 and 15 provide a position reference by contact on profile 12, and the mobile jaws 14 and 16, actuated by hydraulic jacks for which the pressurised fluid is contained in ducts 18, bear on the other two faces of the profile 12 and complete clamping. The arms 10 are composed of a section 19 connected to the central column 3, a section 20 extending the previous section and sliding in it, and a plate 21 connected to the section 20 through a vertical pivot 22. A deployment movement of the section 20 in the radial direction, and pivoting of the plate 22 around the vertical axis, are controlled by numerical control 9 to adjust the radius and direction of the section of the profile 12 that the mandrel 11 clamps. The two arms 10 and the two mandrels 11 are controlled independently. When they both grip the profile 12, they define a machining window between them within which the tool 39 operates, while maintaining the profile 12 at its theoretical position at this location.

The arms 10 are supported by a pair of circular rails 40 and 41 fitted on column 3. They may also be displaced on the said rails 40 and 41 around the column 3, continuously or discontinuously, by the numerical control 9 by means similar to those for the crosspiece 2.

We will now describe support means of the profile 12 (FIGS. 1, 2, 5 and 6). They are marked with the general reference 23 and are composed of an arm 24 and stationary mandrels 25. The arms 24 comprise a slide-in section 26 connected to the central column 3, a median section 27 extending the previous section and fixed to it, an end section 28 fixed to the previous section and carrying the mandrel 25 at the top of the column 29. The end sections 28 may easily be replaced by similar sections with a column 29 with a different height or mandrels 25 with a different shape depending on the section of the profile or the machining type to be done.

The slide-in section 26 may rotate about the column 3 sliding on a pair of circular rails 42 and 43 with which it is provided. The median section 27 may be deployed from the slide-in section 26. The end section 28 can rotate with respect to the median section 27 about a vertical axis 44. All these movements are adjustments accomplished before machining to put the mandrel 25 in the required position and adapt it to a variable radius of curvature of the profile 12; they are then stopped by blocking screws not shown. An anti-vibration support 45 is inserted between the end of the arm 24 and the floor.

An articulated lever 30 at the top of the column 29 supports the mandrel 25. A jack 31 is placed between one end of the lever 30 and a fixed point of the end section 28. The mandrel 25 can apply looser clamping than the mandrels 11 associated with machining: therefore, it can be built using a fixed jaw 32 with an upper cavity comprising two side faces and one lower support face for the profile 12, and a clamping jaw 33 swinging under the effect of a hydraulic jack 46 to provide a higher clamping force and to hold the profile 12 in the cavity. One essential element is that the cavity 32 is mounted flexibly (or "compliant" according to a frequent term used in this technique) onto the lever 30, by means of elastic blocks 35 that enable movements of the profile 12 within the plane of FIGS. 5 and 6, in the radial direction and about a vertical axis. The support is thus adapted to deformations imposed on the profile 12 during machining and prevents excessive forces from being transmitted to the profile, while maintaining sufficient positioning of this profile 12, particularly in the horizontal plane. The jack 31 is used to retract the mandrel 25 by lowering it, the clamping jaw 33 then being raised, and to release the profile 12 while preventing any collision with the mobile mandrels 11 during their movement along the profile 12.

We will also mention that among the support arms 24, there is one that is slightly different because it supports a stop 38 rather than a mandrel 25, that will be used to fix one end of the profile 12 and thus provide the machine with a position reference.

Three machining methods may be used. The first can be called "by successive mesh and windowing" and includes the following steps. The profile 12 is placed on the supports composed of the fixed mandrels 25. One of the ends may be put into contact on a stop 38. The fixed mandrels 25 are clamped. The mobile mandrels 11 are placed at a start of machining section of the profile 12 and clamped so as to delimit a first machining window. The portal 1 then moves to an indexed position above the window, and machining is done using the tool holder 5, the portal 1 remaining fixed. One of the mobile mandrels 11 is then moved along the profile 12, remaining in contact with it by a lower clamping pressure enabling it to slide as far as the second required position; the second mobile mandrel 11 remains clamped during this time, and only comes loose when the first mobile mandrel 11 has reached its second position and has been clamped again. The second mobile jaw 11 moves along the profile with the clamping pressure enabling sliding until reaching the second predetermined position: a second machining window is then formed when the second mobile mandrel 11 is clamped again, and the tool 6 completes this second machining after a displacement of the portal 1 if necessary. The same procedure is adopted for all following machining windows; the profile 12 is free to move within the limits mentioned above on the support mandrels 25, deforming elastic blocks 35 that absorb original shape errors and other deformations of the profile 12. Note that the profile 12 is held in place in a horizontal plane by fixed mandrels 25, and that mobile mandrels 11 (one of which is always well tightened) become equal to the remaining degrees of translation and rotation of the profile 12. Therefore, a simply supported assembly is fully maintained throughout the machining, where the machining is done, the profile 12 being provided with a sufficiently flexible assembly elsewhere.

Machining windows may be formed in any order along the profile 12.

The second envisaged machining method is called "by strip and continuous windowing displacement". For example, it may be applied to mill a complete face of the profile 12 over its entire length. One of the ends of the said profile bears on the stop 38. Thus the profile 12 is kept in horizontal plane by the fixed mandrels 25 and at a horizontal reference fixed by the stop 38. To prevent machining reworking marks appearing in different windows, the two mobile arms 10 move simultaneously along the profile 12 at the same time as the tool 39, the mandrel 11 clamping pressure being adjusted to enable sliding. If the machining length is longer than the contact surface of the tool holder 5, the crosspiece 2 is moved around the column 3 at the required velocity.

An intermediate method would consist of making successive windowing on a machining strip, the tool 39 being displaced continuously and mobile mandrels 11 being displaced when the tool 39 reaches the end of a window.

The invention claimed is:

1. A machine for machining a flexible profile, comprising:
a tool mounted on a tool holder, said tool being configured to machine the profile;
a pair of mobile mandrels configured to releasably clamp the profile at free ends of respective arms and at either side of the tool along the profile;
a support for the profile, said support comprising stationary mandrels configured to clamp the profile and a stationary structure, the stationary mandrels being mounted on the stationary structure through compliant connections; and
a numerical control configured to control a position and displacement of a crosspiece, wherein the tool holder is mounted on the crosspiece;
wherein during machining of said profile, said mobile mandrels are configured to move with said tool holder along said profile, wherein said mobile mandrels do not move the profile, said profile remaining stationary relative to the stationary mandrels; and
wherein said compliant connections are configured to allow movement of the flexible profile during machining in response to deformations imposed on the flexible profile during machining.

2. A machine according to claim 1, wherein the compliant connections comprise elastic blocks.

3. An machine according to claim 1, wherein the support comprises jacks configured to individually release a clamping of the profile by the stationary mandrels and to retract the stationary mandrels aside the profile.

4. A machine according to claim 1, wherein said profile is a circular profile lying on the stationary structure in a horizontal plane, wherein the arms each comprise a first section connected to a central stationary vertical column and rotatable around the column, a second section extending the first section and sliding in the first section in a radial direction perpendicular to the column, a vertical pivot connecting the second section and the mobile mandrels, and the compliant connections allow movements of the profile at least in the radial direction and about vertical axes.

5. A machine according to claim 4, comprising a circular track concentric to the column and a crosspiece straddling the circular track and the column, the tool holder being mounted on the crosspiece.

6. A machine according to claim 1, wherein the stationary structure comprises a stop configured to position one axial end of the profile.

7. A machine according to claim 1, wherein the tool holder moves independently of the mobile mandrels.

8. A machine for machining a flexible profile, comprising:
a tool mounted on a tool holder, said tool being configured to machine the profile;
a pair of mobile mandrels each comprising relatively mobile, opposite jaws which are configured to releasably clamp the profile at free ends of respective arms and at either side of the tool along the profile;
means for moving the arms and the tool individually during machining so that the mobile mandrels define windows therebetween along the profile, said windows having variable widths and the tool moving inside said windows;
a support for the profile, said support comprising stationary mandrels configured to clamp the profile and a stationary structure, the stationary mandrels being mounted on the stationary structure through compliant connections; and
a numerical control configured to control a position and displacement of a crosspiece, wherein the tool holder is mounted on the crosspiece;
wherein during machining of said profile, said mobile mandrels are configured to move with said tool holder along said profile, wherein said mobile mandrels do not move the profile, said profile remaining stationary relative to the stationary mandrels; and
wherein said compliant connections are configured to allow movement of the flexible profile during machining in response to deformations imposed on the flexible profile during machining.

9. A machine according to claim 8, wherein the compliant connections comprise elastic blocks.

10. An machine according to claim 8, wherein the support comprises jacks configured to individually release a clamping of the profile by the stationary mandrels and to retract the stationary mandrels aside the profile.

11. A machine according to claim 8, wherein said profile is a circular profile lying on the stationary structure in a horizontal plane, wherein the arms each comprise a first section connected to a central stationary vertical column and rotatable around the column, a second section extending the first section and sliding in the first section in a radial direction perpendicular to the column, a vertical pivot connecting the second section and the mobile mandrels, and the compliant connections allow movements of the profile at least in the radial direction and about vertical axes.

12. A machine according to claim 11, comprising a circular track concentric to the column and a crosspiece straddling the circular track and the column, the tool holder being mounted on the crosspiece.

13. A machine according to claim 8, wherein the stationary structure comprises a stop configured to position one axial end of the profile.

14. A machine according to claim 8, wherein the tool holder moves independently of the mobile mandrels.

* * * * *